Feb. 18, 1947.  T. P. SIMPSON  2,416,230
METHOD AND APPARATUS FOR OPERATIONS WITH A CONTACT MASS
Filed March 3, 1944  3 Sheets-Sheet 2

INVENTOR
Thomas P. Simpson
BY
ATTORNEY

Fig. 6.

Patented Feb. 18, 1947

2,416,230

UNITED STATES PATENT OFFICE 2,416,230

METHOD AND APPARATUS FOR OPERATIONS WITH CONTACT MASSES

Thomas P. Simpson, Woodbury, N. J., assignor to Socony-Vacuum Oil Company, Incorporated, a corporation of New York Application March 3, 1944, Serial No. 524,925

16 Claims. (Cl. 196—52)

1

This invention deals with a method and apparatus for introduction of a contact mass material into a vessel wherein fluids are contacted with a continuously flowing particle form contact mass under pressures substantially above that of an external contact mass supply hopper. The contact mass material may be used in such processes as a catalyst for desired fluid reactions or it may be used for other purposes. Exemplary of processes of this kind is the cracking conversion of hydrocarbons, it being well known that hydrocarbons of a gas oil nature boiling between about 500° F. and 750° F. may be cracked to gasoline and other products by passing them at a reaction temperature and pressure such as, for example, temperatures of the order of 750° F. and higher and pressures somewhat above atmospheric in contact with a solid adsorptive catalytic contact mass. Usually such contact masses partake of the nature of fuller's earth, or other natural or treated clays and/or various synthetic associations of alumina, silica and alumina, and silica, any of which may have other constituents added for a purpose in connection with the process such as certain metallic oxides. Such contact masses are often used in form of various shaped particles, and it is generally practical to use a certain range of particle sizes rather than any set single particle size.

In a most recent form, this process has been developed as one in which the particle form contact mass material is moved cyclically through two zones in the first of which it is subjected to fluid reaction and in the second of which it is subjected to the action of a fluid regeneration medium such as a combustion supporting gas, acting to burn off contaminant materials deposited upon the contact mass during reaction. Generally hoppers are provided above each of said zones from which hoppers the contact material gravitates to the said zones through suitable confined passages and conveyors such as bucket elevators are provided to convey the contact material from the drain from one zone to the hopper above the other.

This invention has specifically to do with a method and apparatus for the transfer of contact material from the hoppers to the respective zones therebelow. It is usually necessary to operate one or both of said zones above atmospheric pressure and it is generally economical and practically desirable to operate the conveyors and surge hoppers at a pressure below that in the zones such as atmospheric. It has been found that if the confined passage or pipe connected between the hopper and conversion vessel is of sufficient vertical length and that if the convertor is operated so as to cause throttling of the flow of contact material from the lower end of said pipe, the contact material will gravitate down through said pipe and into the convertor against the higher fluid pressure in said convertor. Such a system is disclosed and covered by the copending application of Simpson et al., Serial No. 441,316, filed May 1, 1942, of which the present applicant is one of the inventors.

Due to the positive pressure differential between the convertor and the hopper, vapor reactants or more generally an inert seal vapor generally used in the upper section of the convertor will pass upwards through the column of downwardly flowing contact material and out from the top of the hopper. This vapor flow has a retarding action on the downward motion of the contact material, the retarding force being greater for particles of smaller size and/or lower density. The rate of upward vapor flow and the retarding action thereof on the downward flow of contact material in the pipe between the convertor and the hopper increases as the vertical length of said pipe approaches the minimum required to force contact material flow; and below this minimum the rate of vapor flow is sufficient to prevent the downward flow of contact material. Since the length of conveyors and the structural steel requirements increase with increase in vertical length of the contact material flow pipe between the convertor and hopper, it is desirable to limit the vertical length of said pipe as near as practical to the minimum required for contact material flow. Also since for the same pressure differential between the convertor and hopper the rate of vapor flow through the contact material column therebetween will increase with increase in average particle size and since for the same vapor flow rate the retarding effect due thereto varies for different size contact material particles, it is desirable to limit the range of particle size of the contact material within as narrow limits as are practical and to provide sufficient vertical pipe length between the convertor and hopper to insure downward flow of the smaller particles present in the contact material mass. As an example of a typical practical range of contact material particle size, material made up of particles ranging from 8 to 40 mesh size has been found useful for some operations.

It has been found during the use of such contact material feed pipes of the type above described that under certain heretofore unpredictable circumstances, especially when the length of the feed pipe was such that the head created by the column of contact material therein was only a little greater than that in the convertor, the flow of contact material through the feed pipe to the convertor would suddenly substantially entirely stop and could not generally be re-established without release of the convertor pressure. This not only necessitates diverting the reactant vapors from the convertor thereby resulting in the loss of operating time but also seriously upsets the operating conditions of the entire cyclic system and of the product fractionating system thereby causing a further loss in operating time.

After extensive investigations it was finally discovered that these unpredictable contact material flow interruptions were caused by gradual accumulations of undersized contact material in the upper section of the feed leg. Due to the normal gradual attrition of the contact material particles in the course of flow through a continuous cyclic system such as hereinbefore described, small quantities of fines or undersized material of much smaller diameter than the average diameter of the normal sized contact material accumulate in the contact material mass and are delivered into the hopper above the feed leg along with the normal size contact material. Up to a certain maximum percentage of this undersized material is swept down through the feed pipe into the convertor by the larger particles. If more than this percentage of undersized material is present in the contact material supply to the convertor feed pipe, the excess is prevented by the upward flowing inert vapor in the feed pipe from passing down therethrough. In fact, some very small particles which have been swept down a short distance into the feed pipe may actually be forced upwards by the vapor flow. Thus the excess undersized material gradually accumulates in the upper part of the feed pipe and especially at the top thereof. When the accumulation at the top of the pipe becomes sufficient the main bulk of contact material flow sweeps it down a short distance into the feed pipe. The result is a localized zone in the feed pipe in which the percentage of undersized material is very high. The retarding effect of the vapor passing up through the larger contact material in the column below this zone is much greater on the very fine size material and is sufficient to stop the downward flow of said fine size material and the flow of substantially all the contact material thereabove, thereby stopping the flow of contact material to the convertor.

A major object of this invention is the provision of a system for continuous, uninterrupted introduction of particle form contact mass material to a zone operating under pressure for contact with a gaseous material therein.

A specific object of this invention is the provision in a continuous cyclic process of the type hereinbefore described of a means for prevention of interruptions, due to accumulation of undersized contact material particles, of gravitational flow of particle form contact mass material in feed pipes to conversion vessels operating under fluid pressures substantially above those at the inlet to said feed pipes.

These and other objects will become apparent in the following description of this invention. Inasmuch as the system of this invention will apply equally well to contact material feed pipes supplying regenerators, convertors or other vessels operating under gaseous pressures above those at the supply end of said feed pipes, the term convertor will hereinafter be used in the description and claiming of this invention in a sense sufficiently broad to cover any of these applications.

In order to better understand this invention reference should now be made to the drawings attached hereto. In these drawings

Figures 1, 2, 3:
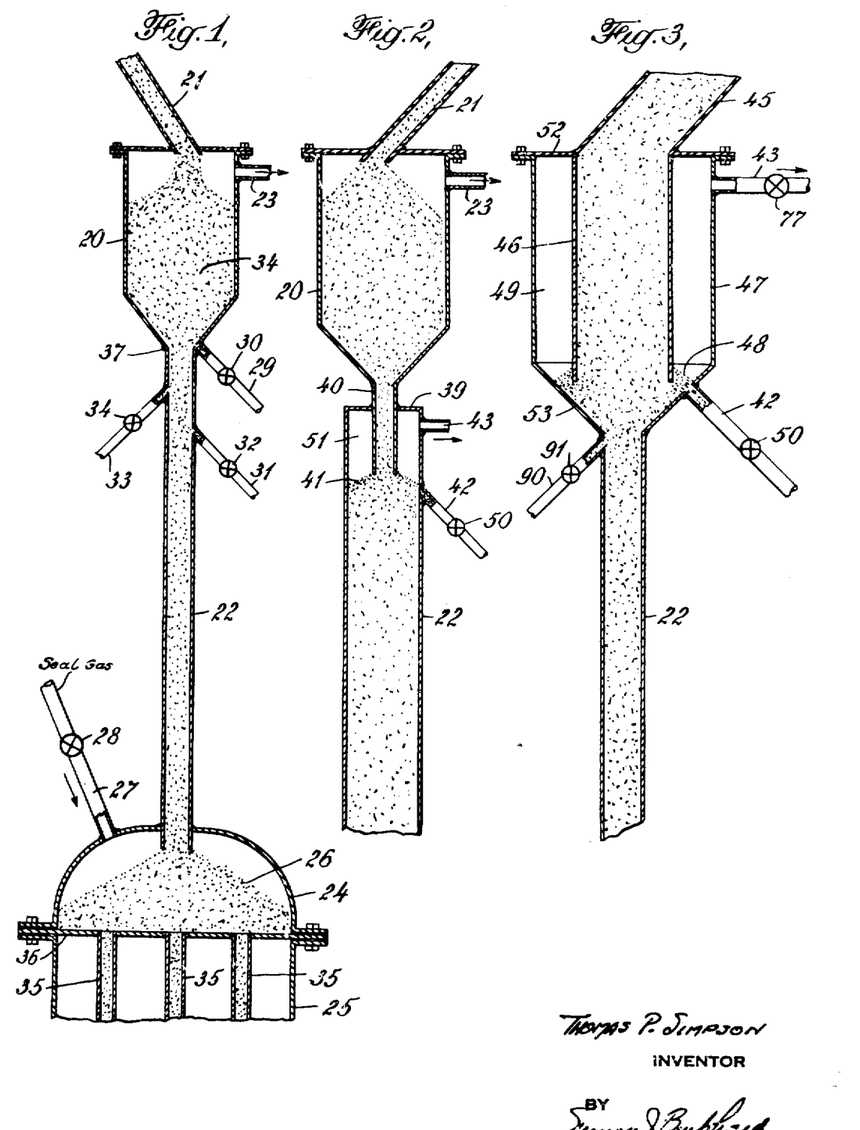
Figure 1 is an elevational view, partially in section, showing one form of the invention.
Figure 2 is an elevational view, partially in section, showing a preferred method for removing undersized contact material from the upper end of the convertor feed pipe.
Figure 3 shows an equivalent method and apparatus for accomplishing the same purpose.

Turning now to Figure 1, we find a hopper 20 to the top of which is connected contact material inlet pipe 21 and near the top of which is connected a vapor vent pipe and in which hopper is an accumulation of contact material 34. At a location below the hopper is the head section 24 of a conversion vessel 25, which head section is terminated by plate 36 extending horizontally across said head section. Depending from the plate 36 are the open end pipes 35 which extend down to the convertor reaction zone. Within the head section is maintained an accumulation of particle form contact material 26 from which contact material flows through pipes 35 to the reaction zone (not shown). Connected to the top of the head section is the pipe 27 with valve 28 therein. Connected between the hopper 20 and convertor head section 24 is the pipe 22 which should be of such length that the head created by the column of contact material therein may be greater than the pressure differential between the convertor head section 24 and hopper 20. This contact material feed pipe 22 may be of any desired cross sectional shape but the cross sectional area thereof must be sufficient to allow the desired contact material flow rates. It is obvious that two or more smaller pipes could be used instead of one single pipe. Moreover, these pipes need not be absolutely vertical but may form any slope with the horizontal that is greater than the normal angle of repose of the contact material being used. Vertical pipes however have been found preferable.

In the description and claiming of this invention, the term contact material "feed pipe" will be used in a sense sufficiently broad to cover the use of one or more pipes having any slope with the horizontal which is greater than the normal angle of repose of the contact material and having any desired cross sectional shape. In the description and in the claiming of this invention the term "head" as used in connection with the column of contact material in the feed leg to the conversion zone or to the conversion zone seal chamber is intended to mean the total weight of contact material in the feed leg column above its lower end per unit of feed leg cross-sectional area. The head may be determined by measuring the volume of the feed leg above its lower end, multiplying the volume by the weight per unit of volume of the contact material measured as a substantially compact mass of downwardly flowing particles and dividing by the cross-sectional area of the feed leg at its lower end.

Connected to pipe 22 at location adjacent to the connection 37 between the hopper 20 and pipe 22 are downwardly sloping pipes 33 and 31 in which are the valves 34 and 32, respectively. Connected to the hopper 20 at a location adjacent to the connection between hopper 20 and pipe 22 is the downwardly sloping pipe 29 with valve 30 therein. The slope of any of these pipes with the horizontal is at least equal to the angle of slide of the contact material used. This angle of slide is that minimum angle of a flat smooth surface with the horizontal required for gravitational slide therefor of a layer of contact material one particle thick.

Figure 6:
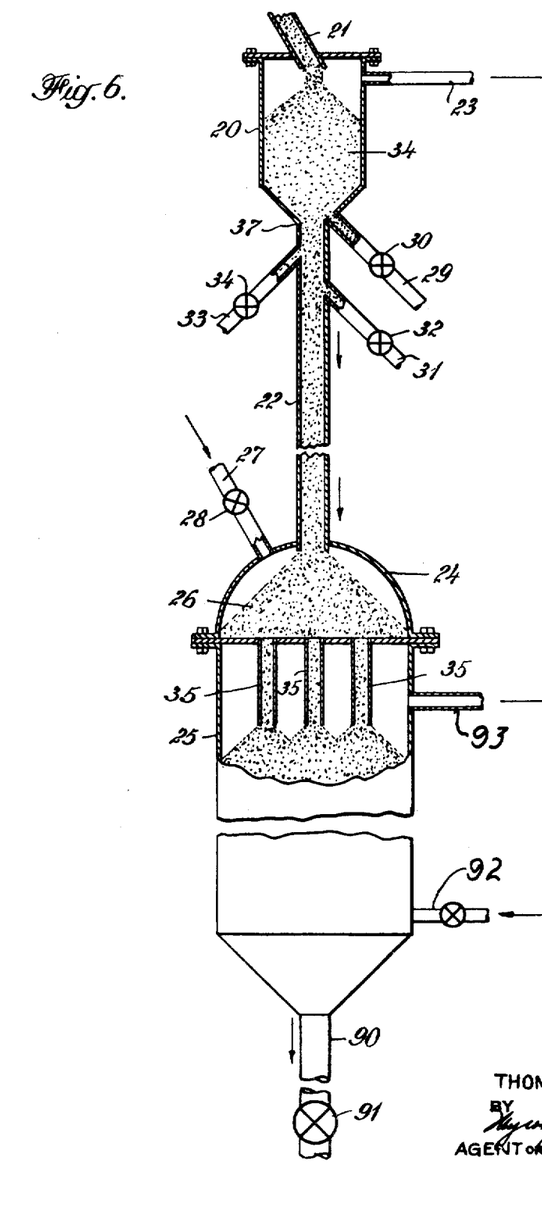
Figure 6 is an elevational view, partially in section showing the feeding apparatus of Figure 1 and the conversion vessel therebelow.

Turning to Figure 6, we find the feeding arrangement shown in Figure 1 and also the lower section of a conversion vessel having a gas inlet 92 near its lower end, a gas outlet 93 near its upper end and a catalyst drain conduit 90 from the bottom of the conversion vessel bearing flow throttling valve 91. Other members in Figure 6 bear the same numerals as used in Figure 1.

In operation particle form contact mass material is delivered by a conveyor to pipe 21 through which it passes to the accumulation of contact material 34 in hopper 20. From the bottom of the hopper 20 contact material continuously flows through vertical pipe 22 to the head section 24 of the convertor and then through pipes 35 to the conversion zone. The contact material flow from the bottom of the conversion zone is throttled so as to maintain the contact material in the conversion zone and in the pipe 22 as a substantially continuous column or stream of closely packed particle form downwardly flowing contact mass material. The pressure in the conversion zone may be above atmospheric, for example, in the order of eight pounds per square inch gauge. Inert gas, such as steam, is introduced through control valve 28 and pipe 27 into the head section 24 in the space above the accumulation of contact material 26 therein at such a rate as to maintain the pressure in head section 24 equal to or slightly above that in the convertor. Thus conversion vapors are prevented from entering head section 24 and flowing upwards through pipe 22, but a limited amount of inert gas does flow upwards through the column of contact material in pipe 22 and out through vent 23 near the top of hopper 20. If the percentage of undersized contact material, say, for example, 300 mesh size material, present in the supply to pipe 22 is greater than the maximum percentage of such material which will be swept down through pipe 22 to the convertor by the normal size material particles, say, for example 10–30 mesh size, then the excess of said undersized material will accumulate in that section of the pipe 22 adjacent its connection with the hopper 20. Such accumulated undersized contact material and some normal size material is periodically or preferably continuously withdrawn from the system through pipes 29, 33 or 31 or any combination thereof. The undersized material thus withdrawn may be screened from the normal sized material or separated therefrom by other known methods and the normal size material may then be returned to the cyclic system at some convenient location. The proper placement of the pipes 29, 33 and 31 are locations where the undersized contact material tends to accumulate is dependent upon a number of variables such as relative size of undersized and normal sized contact material, vapor and contact material, vapor and contact material flow rates and other variables inherent in a given specific application. The proper location of these pipes is best determined experimentally for the particular conditions involved. As an example, it was found that in an apparatus having a 20 foot vertical feed pipe connected at its lower end to a chamber wherein air pressure was 5 to 6 pounds per square inch gauge and at its upper end to a supply funnel at 0 pounds per square inch gauge, when the linear rate of flow of a nominal 8 to 30 mesh particle form contact mass material of approximately 48 pounds per cubic foot apparent unpacked density was about 2 to 20 feet per minute, the undersized contact material was found to accumulate in the pipe within about the upper third and principally at the inlet to said pipe.

Since the principal accumulation of undersized contact material particles occurs generally at or near the upper end of the feed pipe, material withdrawn from only that location may contain lower percentage of the normal size particles of contact material, it is generally preferable to withdraw material only from that location. An apparatus more suitable for accomplishing this purpose is shown in Figure 2.

In Figure 2, is shown a hopper 20 and the upper section of a contact material feed pipe 22, the lower end of which pipe connects into a convertor head section (not shown) in which is maintained a gaseous pressure. The upper end of pipe 22 is closed by plate 39 to which is connected and through which extends the pipe 40, the upper end of which is connected to the bottom of the hopper 20. The pipe 40 may extend a short distance, for example, about one or two feet or less, down within pipe 22 thereby providing the vapor-solid disengaging space 51 in the top section of pipe 22. Connected to the pipe 22 near the top of space 51 is the vent pipe 43.

The inert blanket gas from the convertor head section passes up through the column of contact material maintained in pipe 22 and disengages from the contact material in the lower section of the space 51 and passes from the system through pipe 43. If desired the cover plate 39 may be omitted and vapor withdrawn at this location. Excess undersized contact material particles, if present accumulate mainly at the surface 41 of the contact column and may be easily withdrawn through pipe 42 and control valve 50 therein before the accumulation of said material becomes sufficient to cause interference with the flow of contact material in pipe 22. It is important that the slope of pipe 42 be sufficient to permit flow of contact material therethrough. Slopes of 40° or more with the horizontal have been found satisfactory for most particle form contact materials.

It should be understood that the hopper 20 in Figures 1 and 2 need not necessarily be a separate vessel but may be merely an enlarged connecting pipe between a conveyor and the top of the contact material feed pipe. Unless otherwise specified, the word "hopper" as used in this specification, and in the claiming of this invention will be used in a sense sufficiently broad to cover either construction.

In Figure 3 is shown an example of this latter construction. In this figure, 45 is the contact material passage pipe from a contact material conveyor (not shown) and 46 is a vertical continuation thereof. Positioned concentrically with pipe 46 is pipe 47 which is connected to pipe 46 and closed off at its upper end by plate 52. The lower end of pipe 47 is connected to pipe 22 by means of the conical section 53. The lower end of pipe 46 extends down through pipe 47 short of this conical section.

In operation inert gas after passing upwards through convertor feed pipe 22 countercurrent to contact material flow therein disengages from the contact material at surface 48 and leaves the system through vent pipe 43. If the pressure at the top of the pipe 22 is to be maintained other than atmospheric, the valve 77 in pipe 43 is used to throttle the gas flow therethrough. Excess undersized contact material, if present, accumulates at the surface 48 and a short distance therebelow and is withdrawn from the system through drain pipe 90, having valve 91 therein or through drain pipe 42 connected to the conical section 53.

Although the systems described under Figures 2 and 3 are designed to permit withdrawal of a reasonably concentrated side stream of undersized particle form contact material, still an appreciable percentage of the material withdrawn may be normal size contact material which must be separated externally from the undersized material before return to the system.

Figure 4:
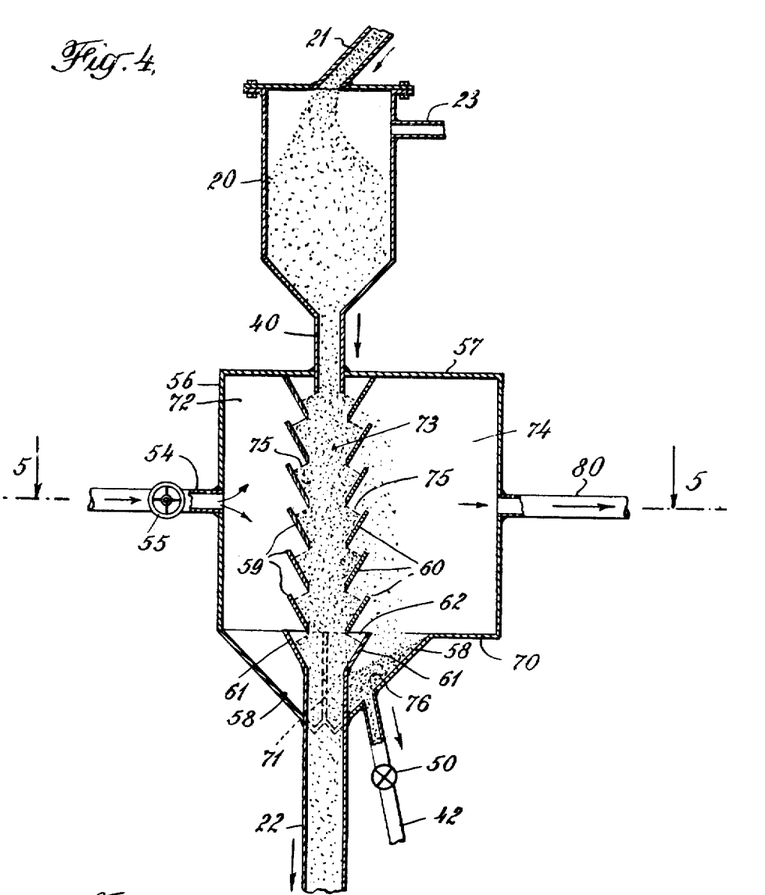
Figure 4 is an elevational view, partially in section, showing another preferred apparatus and method for preventing accumulation of undersized contact material in the convertor feed pipe.
Figure 5:
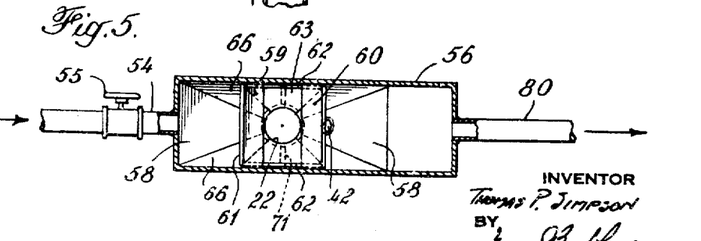
Figure 5 is a sectional view taken at line 5—5 in Figure 4.

A method of withdrawing a side stream of contact material from the convertor contact material feed system which consists almost entirely of undersized contact material particles is shown in Figures 4 and 5. Figure 4 is an elevational view, partially in section, showing the upper end of a converter feed pipe 22, a hopper 20 and inserted therebetween an apparatus for removal of undersized contact material. Figure 5 which should be read together with Figure 4 is a sectional view of this apparatus taken at line 5—5 of Figure 4.

A pipe 40 is connected to the top 57 of the rectangular box-shaped vessel 56 and extends a short distance down into the vessel. The lower end of vessel 56 is closed partially by plate 70 and partially by the pairs of oppositely placed plates 58 and 66 which slope downwards from the sides of vessel 56 to the periphery of the pipe 22 to which they are fitted and welded at a location somewhat below the upper end of said pipe 22. Thus there is formed a tapered drain section on the bottom of vessel 56, near the bottom of which drain section is connected a drain pipe 42 with valve 50 therein. Near the upper end of the pipe 22 is fitted and welded a funnel of rectangular cross sectional shape which is formed by pairs of oppositely placed plates 62 and 61, the plates 62 sloping upwards from pipe 22 to two opposite sides of the vessel 56 and attached thereto and the plates 61 sloping upwards from pipe 22 so as to form the bottom baffles of the two baffle formed walls to be described hereinafter. The vessel 56 is internally divided into a vapor inlet section 72, a contact material passageway 73 and a vapor outlet section 74 by means of two vertical walls formed by two rows of superposed plate baffles 59 extending horizontally across the vessel 56 in a direction perpendicular to that of the drawing. These plates are so spaced and arranged as to form essentially two parallel louvered or slotted walls through the slots of which vapors may freely pass but through which the contact material will not fall or flow. It will be seen that the top plate baffles of each wall extend up to and are connected to the top 57 of vessel 56 thereby preventing vapor channeling over the top of the contact material column confined between the two louvered walls. Also to prevent bypassing of vapor through the drain section 76 of vessel 56 around that portion of conduit 22 extending thereinto, vertical plate baffles 71 are connected between the upper end of pipe 22 and the plates 62 in the vessel drain section. Connected to opposite sides of the vessel 56 are vapor inlet pipe 54 with valve 55 therein and vapor outlet pipe 80.

In operation, contact material is directed into the passageway 73 by pipe 40 and then flows downwards therethrough as a substantially continuous column of closely packed particle form contact mass material. The contact material then passes into pipe 22 through the funnel formed by plates 61 and 62 and finally passes down through pipe 22 to the convertor (not shown) which is operating under a gaseous pressure. It can be seen that the column of contact material in passageway 73 is essentially an unbroken continuation of the column of contact material in pipe 22. Inert vapors from the convertor after passing upwards through the column of contact material in pipe 22 passes through the column of contact material in column 73 or through part of said column and disengages therefrom at the contact material surfaces in the slot spaces 75 between baffle plates 59 adjacent the vapor outlet section 74 of vessel 56. This tends to accumulate undersized contact material particles at said disengaging surfaces. Additional vapors charged through control valve 55 and pipe 54 into inlet chamber 72 pass horizontally across the column of contact material in passageway 73 and also disengage therefrom at said disengaging surfaces. The combined velocity of these two vapor streams in the slotted spaces between baffles 59 adjacent the vapor outlet section 74 is thus maintained sufficient to result in the entrainment of the undersized contact material particles into the section 74 but insufficient to so entrain the normal size particles. The cross sectional area of the section 74 being considerably greater than that of the slot spaces 75 between baffles 59, the vapor velocity in said section 74 falls below that required to entrain the undersized contact material and said contact material falls to the drain section 76 of vessel 56 from which it is withdrawn through pipe 42 and control valve 50 therein. The effluent vapor passes from the system through pipe 80.

The above operation takes advantage of the fact that larger solid particles are entrained in vapor streams only at considerably higher vapor stream velocities than are smaller particles of the same density. The vapor rate required to entrain the undersized material without entraining the normal size material will vary dependent upon the inherent variables in any given application such as size, shape and density of contact material particles, the nature of the vapor and the temperature and pressure of the operation. Thus the required rate must be experimentally determined for each application but with proper apparatus design considerable flexibility of vapor rate is obtainable merely by regulation of vapor rate charged through pipe 54. Experimental work has shown that for an ordinary granular clay type catalyst of an apparent unpacked density of about 37 pounds per cubic foot, the linear velocity of atmospheric pressure air at 80° F. required to entrain particles of 0.10 inch and 0.02 inch diameter was about 30 feet per second and 6 feet per second respectively.

As has been hereinbefore stated a certain maximum percentage of undersized contact material particles may be swept down through the convertor feed pipe into the convertor by the normal size particles without interruptions in the continuous flow of contact material through said feed pipe. Thus it becomes necessary only to remove from the system any excess undersized particle form contact material over this maximum limiting percentage, although more may be removed if desired. Since the maximum limiting percentage of undersized contact material which may pass down through the convertor feed pipe without interruption of the contact material flow is dependent upon a number of variables such as the relative difference in the diameter of the undersized contact material and the average diameter of the normal sized contact material, the rate of contact material flow through the feed pipe and the nature of the vapor and the rate of flow thereof in the feed pipe, it is obvious that no single limiting percentage figure may be given for the operation of this invention and that the limiting percentage value must be determined for each specific application. With the aid of disclosures given in this specification those skilled in the art may readily make such determinations. As an example of the determination of this value for a specific application, it was found that when a particle form contact material having an apparent unpacked density of 48 pounds per cubic foot and an average particle size of about 0.027 inch diameter was passed downwards at a linear velocity of about 22 feet per minute through a vertical pipe having a length of 20 feet and terminating in a chamber wherein an air pressure of 5 pounds per square inch gauge and temperature of 70° F. is maintained over an accumulation of contact material, the maximum percentage of undersized contact material particles of diameter less than about 0.016 inch which may be swept down through said pipe without interruption of the flow of contact material in said pipe is in the order of 5 to 10 per cent by weight of the total contact material flow.

It should be understood that the various embodiments of this invention and examples of its operation and application given herein are intended to be merely exemplary in character and are not intended in any way to limit the scope of this invention except in so far as such limitations are specified in the appended claims.

I claim:

1. In a process for contacting fluids under pressure with a continuously flowing substantially compact body of particle form solid compact mass material, and continuously introducing said solid to the contacting vessel against a fluid pressure therein, the steps which comprise: continuously supplying said solid to said contacting vessel from an elongated confined substantially compact stream of solid extending upwards from said contacting vessel and having a greater head of solid than the pressure in said conversion vessel, continuously supplying said solid to the upper end of said confined substantially compact stream of solid and withdrawing a controlled quantity of solid material from a location near the supply end of said stream at which location the linear velocity of gas flow through the solid material induced by the pressure in said contacting vessel is substantially greater than it is at the location of greatest cross section in the supply, said withdrawn solid material containing a greater percentage of less readily gravitated particles than said solid supplied to the upper end of said compact stream.

2. In a process of the type described a method of introducing particle form solid contact mass material to a convertor wherein there is maintained a gaseous pressure substantially higher than the pressure over an external confined accumulation of particle form contact mass material located above said convertor, comprising continuously passing said contact material in the form of a confined substantially continuous compact column of said solid from said external confined accumulation of solid to said convertor, and withdrawing from a location adjacent the junction of said column of contact material with said external confined accumulation of solid a controlled quantity of said solid having an average particle diameter less than that of the solid passing into said convertor from said compact column.

3. In a process of the type described a method of introducing particle form solid contact mass material to a convertor in which is maintained a gaseous pressure substantially above that maintained over a body of contact material in a continuously supplied supply hopper positioned thereabove, comprising continuously gravitating said contact material in the form of a substantially compact confined column of contact material from said supply hopper to said convertor, and withdrawing from a location adjacent the junction of the upper end of said column of contact material with said body of contact material a controlled quantity of contact material containing at least that quantity of less readily gravitated particle form contact mass material supplied to said hopper which is in excess of the quantity which may be swept down said column of contact mass material by more readily gravitated contact material to said convertor without interruption of the flow of said contact material in said column.

4. In a process of the type described a method of introducing particle form solid contact mass material to a convertor in which is maintained a gaseous pressure substantially above that maintained over a body of contact material in a continuously supplied supply hopper positioned thereabove, comprising continuously gravitating said contact material in the form of a substantially compact confined column of contact material from said supply hopper to said convertor, and withdrawing from a location adjacent the junction of the upper end of said column of contact material with said body of contact material a controlled quantity of contact mass material containing a percentage of fines substantially greater than the percentage of fines in the contact mass material supplied to said supply hopper.

5. In a process of the type described a method of introducing particle form solid contact mass material to a convertor in which is maintained a gaseous pressure substantially above that maintained over a body of contact material in a continuously supplied supply hopper positioned thereabove, comprising continuously gravitating said contact material in the form of a substantially compact confined column of contact material from said supply hopper to said convertor, and withdrawing from a location adjacent the junction of the upper end of said column of contact material with said body of contact material a controlled quantity of contact mass material having an average particle diameter substantially less than that of the particle form contact mass material supplied to said hopper.

6. In a process for contacting fluids under pressure with a continuously flowing substantially compact stream of solid particle form contact mass material, a method of continuously introducing particle form contact mass material to a contacting vessel from an external confined accumulation of contact material located above said contacting vessel and under fluid pressure substantially below that in said contacting vessel, which comprises: introducing particle form contact mass material to said contacting vessel from a substantially compact confined column of said contact material extending upwardly from said contacting vessel to said external confined accumulation of contact material thereabove, which substantially compact column of contact material is of sufficient vertical height to provide a head of contact material greater than the gaseous pressure in said contacting vessel; continuously supplying particle form contact mass material to said external confined supply accumulation; and withdrawing from at least one location adjacent the junction of said column of contact material with said external confined supply accumulation of contact material a controlled quantity of particle form contact mass material containing at least that quantity of undersized contact material particles, supplied to said external confined accumulation of contact material, which is in excess of the quantity of such material which may be swept by the normal sized contact material particles down said column of contact mass material to said contacting vessel without interruption of the flow of said contact material in said column.

7. In a process for continuous catalytic conversion of hydrocarbons in the presence of a continuously flowing substantially compact body of particle form catalyst a method of continuously supplying particle form catalyst to said compact body of catalyst in a conversion vessel against a gaseous pressure maintained in said conversion vessel, comprising: continuously introducing catalyst to said compact body of catalyst in the conversion vessel from an elongated confined substantially compact stream of particle form catalyst extending upwards from said conversion vessel and having a greater head of catalyst than the pressure in said conversion vessel; continuously supplying particle form contact material to the upper extremity of said confined substantially compact stream and withdrawing from a location substantially at the supply end of said confined substantially compact stream of catalyst a controlled quantity of catalyst having an average diameter substantially less than that of the particle form contact material supplied to said compact stream.

8. In a process of the type described the method of introducing particle form contact mass material to a convertor against a gaseous pressure therein, comprising: continuously supplying said contact material to said convertor from an elongated confined substantially compact stream of particle form contact material extending upwards from said convertor and having a greater head of contact material than the pressure in said convertor; continuously supplying particle form contact mass material to the upper end of said confined substantially compact stream of contact material; permitting the flow up through said confined stream of contact material of that quantity of gas flow normally induced by the positive pressure differential between said convertor and said upper supply end of said stream and causing said gas to disengage from the contact material in said stream at at least one surface at said supper supply end of said stream of contact material and withdrawing said disengaged gas from the system; and withdrawing from a location adjacent said supply end of said stream of contact material a controlled quantity of particle form contact mass material having an average particle diameter substantially less than that of the contact mass material supplied to said upper supply end of said stream of contact material.

9. In a process of the type described a method of introducing particle form contact mass material to a convertor wherein is maintained a gaseous pressure substantially higher than the pressure over an external confined accumulation of particle form contact mass material located above said convertor, comprising: continuously passing said contact material in the form of a confined substantially continuous compact column of particle form contact mass material from said external confined accumulation of contact material to said convertor; continuously supplying particle form contact mass material to said external confined accumulation of contact material; permitting disengagement from the contact material in said column, at at least one surface at a location adjacent the junction of said column of contact material with said external confined accumulation of contact material, of gas forced through said column of contact material from said convertor by the pressure in said convertor; withdrawing said disengaged gas from the system; and withdrawing from at least one location adjacent the junction of said contact material column with said external confined accumulation of contact material a controlled quantity of particle form contact mass material containing at least that quantity of undersized contact material particles supplied to said external confined accumulation of contact material which is in excess of the quantity of such material which may be swept by the normal size contact material particles down said column of contact material into said convertor without interruption of the flow of said contact material in said column.

10. Apparatus for continuously introducing particle form contact mass material to a contacting vessel wherein fluids under pressure are contacted with a continuously flowing substantially compact body of particle form contact mass material, comprising: an elongated contact material feed pipe extending upwards from the upper end of said contacting vessel, said feed pipe being of sufficient height that a greater head of contact material may be created therein than the operating pressure in the contacting vessel; means to continuously supply particle form contact mass material to the upper end of said feed pipe; means for withdrawing contact material from the lower end of said contacting vessel; flow throttling means associated with said withdrawal means to permit maintenance of the contact material in said contacting vessel and in said contact material feed pipe as a substantially continuous compact column of downwardly moving particles; means for withdrawing from at least one location adjacent said upper end of said feed pipe a portion of the contact material supplied to said feed pipe.

11. In an apparatus of the type described an apparatus for continuously introducing particle form contact mass material against a gaseous pressure in a conversion vessel wherein gaseous reactants under pressure are contacted with a particle form contact mass material, comprising: an elongated contact material feed pipe connected to the upper end of said conversion vessel and extending upwards therefrom, said feed pipe being of sufficient height that the head of the substantially compact column of particle form contact material created therein will be greater than the pressure in said conversion vessel; a supply hopper located adjacent the upper end of said feed pipe; means to connect the upper end of said feed pipe to said supply hopper; means to continuously supply particle form contact mass material to said supply hopper; means to permit a throttled flow of said contact material from said feed pipe into said conversion vessel, means to withdraw from a location adjacent said means of connection of the upper end of said feed pipe to said supply hopper a controlled quantity of said contact material.

12. In an apparatus for contacting gases under pressure with a particle form contact mass material, comprising: an elongated contact material feed pipe connected to the upper end of a contacting vessel and extending upwards therefrom; said feed pipe being of sufficient height that the head of the substantially compact column of particle form contact mass material maintained therein will be greater than the gaseous pressure in the upper section of said contacting vessel; a supply hopper located adjacent the upper end of said feed pipe; means to continuously supply particle form contact mass material to said supply hopper; means to introduce contact material from said supply hopper to said feed pipe; means to cause throttled flow of said contact material from the lower end of said feed pipe into said contacting vessel; means to withdraw from a location adjacent said means of introduction of contact material from said hopper to said feed pipe of a controlled quantity of particle form contact mass material having an average diameter substantially less than that of the contact material supplied said supply hopper; whereby the percentage of undersized contact material in the contact material passing downwardly through said feed pipe as a substantially compact column may be limited below that which will cause interruption of the flow of contact material in said feed pipe.

13. In an apparatus of the type described an apparatus for continuously introducing particle form contact mass material against a gaseous pressure in a contacting vessel wherein gases are contacted with a particle form contact mass material, comprising a substantially vertical contacting vessel an elongated contact material feed pipe connected to the upper end of said contacting vessel and extending upwards therefrom, said feed pipe being of sufficient height that the head of the substantially compact column of particle form contact mass material maintained therein will be greater than the gaseous pressure in the upper section of said contacting vessel; a supply hopper located adjacent the upper end of said feed pipe; means to continuously supply particle form contact mass material to said supply hopper; a connecting means between the upper end of said feed pipe and said supply hopper; a contact material drain conduit connected to the lower end of said contacting vessel; flow throttling means associated with said drain conduit to permit maintenance of continuity of compact column through said contacting vessel and the length of said feed pipe, means to withdraw from a location adjacent said connecting means between said feed pipe and said supply hopper of a controlled quantity of particle form contact mass material containing fines, whereby the amount of fines in the contact material passing downwardly through said feed pipe may be limited below that which would cause bridging of contact material in said feed pipe.

14. In an apparatus of the type described an apparatus for continuously introducing particle form contact mass material against a gaseous pressure in a contacting vessel wherein gases are contacted with a particle form contact mass material, comprising an elongated contact material feed pipe connected to the upper end of said contacting vessel and extending upwards therefrom, said feed pipe being of sufficient height that the head of the substantially compact column of particle form contact mass material maintained therein will be greater than the gaseous pressure in said contacting vessel; a supply hopper located adjacent the upper end of said feed pipe; means to continuously supply particle form contact mass material to said supply hopper; a connecting means between the upper end of said feed pipe and said supply hopper; means to withdraw contact material from the lower end of said contacting vessel; flow throttling means associated with said withdrawal means to maintain continuity of throttled substantially compact columnar flow through said contacting vessel and said feed pipe at least one secondary pipe connected to said feed pipe at a location adjacent said connecting means between said feed pipe and said supply hopper, said secondary pipe being connected with said feed pipe at a slope with the horizontal which is greater than the angle of slide of said contact material; means inserted in said secondary pipe for throttling the flow of contact material therefrom.

15. In an apparatus of the type described an apparatus for continuously introducing particle form contact mass material against a gaseous pressure in a contacting vessel wherein gases are contacted with a continuously flowing substantially compact mass of particle form contact mass material, comprising an elongated contact material feed pipe connected to the upper end of said contacting vessel and extending upwards therefrom, said feed pipe being of sufficient height that the head of the substantially compact column of particle form contacts mass material maintained therein will be greater than the gaseous pressure in the upper end of said contacting vessel; a supply pipe, the lower end of which has a projected cross sectional area substantially less than the internal cross sectional area of said feed pipe, and the lower end of said supply pipe extending down within the upper end of said feed pipe thereby forming a substantially particle free vapor space between the lower extremity of said supply pipe and the upper extremity of said feed pipe; a means for continuously supplying particle form contact mass material to the upper end of said supply pipe at a rate sufficient to maintain said supply pipe substantially full of closely packed contact mass material; means for withdrawal of vapor from a location adjacent the upper extremity of said feed pipe; at least one secondary pipe connected to said feed pipe at a location adjacent the lower extremity of said supply pipe within said feed pipe, the slope of said secondary pipe with the horizontal being greater than the angle of slide of the contact material; means on said secondary pipe for controlling the rate of flow of particle form contact material therefrom; a contact material drain conduit from the lower end of said contacting vessel and flow throttling means associated therewith.

16. In an apparatus of the type described an apparatus for continuously introducing particle form contact mass material against a gaseous pressure in a contacting vessel wherein gases are contacted with a continuously flowing substantially compact mass of particle form contact mass material, comprising an elongated contact material feed pipe connected to the upper end of said contacting vessel and extending upwards therefrom, said feed pipe being of sufficient height that the head of the substantially compact column of particle form contact mass material maintained therein will be greater than the pressure in said contacting vessel; a cylindrical continuation attached axially to the upper end of said feed pipe and extending thereabove, said cylindrical continuation having an internal cross sectional area substantially greater than that of said feed pipe, a supply pipe having a projected area of cross section substantially less than that of said cylindrical continuation of said feed pipe, the lower end of said supply pipe extending axially into said cylindrical continuation, and the lower extremity of said supply pipe terminating short of the connection of said cylindrical continuation to said feed pipe, said arrangement thereby forming a substantially particle free vapor space between the inner periphery of said cylindrical continuation and the outer periphery of said supply pipe and extending between the lower extremity of said supply pipe and the upper extremity of said cylndrical continuation; means for continuously supplying particle form contact mass material to the upper end of said supply pipe at a rate sufficient to maintain said supply pipe substantially full of closely packed contact mass material; a provision for withdrawal of vapor from a location adjacent the upper extremity of said cylindrical continuation; at least one drain pipe connected to said cylindrical continuation of said feed pipe at a location adjacent the lower extremity of said supply pipe, the slope of said drain pipe being greater than the angle of slide of said contact material; means on said drain pipe for controlling the rate of flow of particle form contact material therefrom; an outlet conduit on the lower end of said contacting vessel for contact material withdrawal and flow throttling means associated with said outlet conduit adapted to control the rate of contact material withdrawal such as to maintain continuity of substantially compact columnar flow of contact material within said contacting vessel and said feed pipe.

THOMAS P. SIMPSON.

REFERENCES CITED

The following references are of record in the file of this patent:

UNITED STATES PATENTS

| Number | Name | Date |
|---|---|---|
| 890,625 | Edison | June 16, 1908 |
| 1,291,137 | Reed | Jan. 14, 1919 |
| 1,801,195 | Fraser | Apr. 14, 1931 |
| 1,841,462 | Waxbom | Jan. 19, 1932 |
| 1,984,380 | Odell | Dec. 18, 1934 |
| 2,161,500 | Bird et al. | June 6, 1939 |
| 2,374,003 | Sheppard | Feb. 24, 1942 |
| 2,290,580 | Degnen et al. | July 21, 1942 |
| 2,064,813 | Andrews | Dec. 22, 1936 |
| 2,321,015 | Davis | June 8, 1943 |
| 2,377,935 | Gunness | June 12, 1945 |
| 2,378,607 | Watts | June 19, 1945 |
| 2,378,542 | Edmister | June 19, 1945 |

OTHER REFERENCES

Simpson, Evans, Hornberg, and Payne, National Petroleum News, Dec. 1, 1943, pp. R563, R564, R566, and R567. (Copy in 196–52.2.)

---

Certificate of Correction

Patent No. 2,416,230.           February 18, 1947.

THOMAS P. SIMPSON

It is hereby certified that errors appear in the printed specification of the above numbered patent requiring correction as follows: Column 5, line 75, for the word "are" read at; column 13, line 23, claim 12, after "apparatus" insert of the type described an apparatus; column 14, line 51, claim 15, for "contacts" read contact; and that the said Letters Patent should be read with these corrections therein that the same may conform to the record of the case in the Patent Office.

Signed and sealed this 8th day of July, A. D. 1947.

[SEAL]

LESLIE FRAZER,
*First Assistant Commissioner of Patents.* material drain conduit from the lower end of said contacting vessel and flow throttling means associated therewith.

16. In an apparatus of the type described an apparatus for continuously introducing particle form contact mass material against a gaseous pressure in a contacting vessel wherein gases are contacted with a continuously flowing substantially compact mass of particle form contact mass material, comprising an elongated contact material feed pipe connected to the upper end of said contacting vessel and extending upwards therefrom, said feed pipe being of sufficient height that the head of the substantially compact column of particle form contact mass material maintained therein will be greater than the pressure in said contacting vessel; a cylindrical continuation attached axially to the upper end of said feed pipe and extending thereabove, said cylindrical continuation having an internal cross sectional area substantially greater than that of said feed pipe, a supply pipe having a projected area of cross section substantially less than that of said cylindrical continuation of said feed pipe, the lower end of said supply pipe extending axially into said cylindrical continuation, and the lower extremity of said supply pipe terminating short of the connection of said cylindrical continuation to said feed pipe, said arrangement thereby forming a substantially particle free vapor space between the inner periphery of said cylindrical continuation and the outer periphery of said supply pipe and extending between the lower extremity of said supply pipe and the upper extremity of said cylndrical continuation; means for continuously supplying particle form contact mass material to the upper end of said supply pipe at a rate sufficient to maintain said supply pipe substantially full of closely packed contact mass material; a provision for withdrawal of vapor from a location adjacent the upper extremity of said cylindrical continuation; at least one drain pipe connected to said cylindrical continuation of said feed pipe at a location adjacent the lower extremity of said supply pipe, the slope of said drain pipe being greater than the angle of slide of said contact material; means on said drain pipe for controlling the rate of flow of particle form contact material therefrom; an outlet conduit on the lower end of said contacting vessel for contact material withdrawal and flow throttling means associated with said outlet conduit adapted to control the rate of contact material withdrawal such as to maintain continuity of substantially compact columnar flow of contact material within said contacting vessel and said feed pipe.

THOMAS P. SIMPSON.

REFERENCES CITED

The following references are of record in the file of this patent:

UNITED STATES PATENTS

| Number | Name | Date |
|---|---|---|
| 890,625 | Edison | June 16, 1908 |
| 1,291,137 | Reed | Jan. 14, 1919 |
| 1,801,195 | Fraser | Apr. 14, 1931 |
| 1,841,462 | Waxbom | Jan. 19, 1932 |
| 1,984,380 | Odell | Dec. 18, 1934 |
| 2,161,500 | Bird et al. | June 6, 1939 |
| 2,374,003 | Sheppard | Feb. 24, 1942 |
| 2,290,580 | Degnen et al. | July 21, 1942 |
| 2,064,813 | Andrews | Dec. 22, 1936 |
| 2,321,015 | Davis | June 8, 1943 |
| 2,377,935 | Gunness | June 12, 1945 |
| 2,378,607 | Watts | June 19, 1945 |
| 2,378,542 | Edmister | June 19, 1945 |

OTHER REFERENCES

Simpson, Evans, Hornberg, and Payne, National Petroleum News, Dec. 1, 1943, pp. R563, R564, R566, and R567. (Copy in 196–52.2.)

---

Certificate of Correction

Patent No. 2,416,230. February 18, 1947.

THOMAS P. SIMPSON

It is hereby certified that errors appear in the printed specification of the above numbered patent requiring correction as follows: Column 5, line 75, for the word "are" read *at*; column 13, line 23, claim 12, after "apparatus" insert *of the type described an apparatus*; column 14, line 51, claim 15, for "contacts" read *contact*; and that the said Letters Patent should be read with these corrections therein that the same may conform to the record of the case in the Patent Office.

Signed and sealed this 8th day of July, A. D. 1947.

[SEAL]

LESLIE FRAZER,
*First Assistant Commissioner of Patents.*